United States Patent [19]

Elander et al.

[11] Patent Number: 4,805,280
[45] Date of Patent: Feb. 21, 1989

[54] METHOD OF JOINING METALS OF DIFFERENT PHYSICAL PROPERTIES

[75] Inventors: Jay C. Elander, Hopkins; Wayne G. Godfrey, New Hope, both of Minn.

[73] Assignee: Honeywell Inc., Minneapolis, Minn.

[21] Appl. No.: 156,153

[22] Filed: Feb. 16, 1988

[51] Int. Cl.$^4$ .................... B21D 53/10; B23P 11/00
[52] U.S. Cl. .................... 29/149.5 DP; 29/432; 29/432.2; 29/509; 29/520; 29/882; 29/596; 403/283
[58] Field of Search .............. 29/432, 596, 432.2, 29/149.5 DP, 509, 149.5 R, 520, 882; 403/283

[56] References Cited

U.S. PATENT DOCUMENTS

| | | | |
|---|---|---|---|
| Re. 21,433 | 4/1940 | Pedersen | 29/432 X |
| 930,863 | 8/1909 | Kearney. | |
| 2,236,288 | 3/1941 | Engle et al. | 29/432 UX |
| 2,360,063 | 10/1944 | Larson | 29/874 X |
| 2,413,317 | 12/1946 | Frost. | |
| 2,419,469 | 4/1947 | Spiro | 29/882 |
| 2,646,613 | 7/1953 | Enzler. | |
| 3,049,791 | 8/1962 | Shackman | 29/882 |
| 3,130,489 | 4/1964 | Schlage | 29/432 |
| 3,499,211 | 3/1970 | Dubuc | 29/882 X |
| 3,553,831 | 1/1971 | Palmer et al. | 29/599 |
| 3,729,804 | 5/1973 | Middleton | 29/432 |
| 3,768,144 | 10/1973 | Heinss | 29/432 |
| 3,847,700 | 11/1974 | Dalal et al. | 29/432 X |
| 4,621,661 | 11/1986 | Greiner | 29/432 X |

FOREIGN PATENT DOCUMENTS

| | | | |
|---|---|---|---|
| 1142914 | 9/1957 | France | 29/432 |
| 497270 | 12/1938 | United Kingdom | 29/432 |

Primary Examiner—Charlie T. Moon
Attorney, Agent, or Firm—Alfred N. Feldman; Clyde C. Blinn

[57] ABSTRACT

A method of manufacturing wherein a first metal member is installed into a second metal member is disclosed. The first metal member is punched out of a stock into the second metal member which extrudes a slug. The combination is then placed over a flat surface and a second larger punch is applied to cause the slug to reflow back up into its original structure, but with that reflow crimping the first metal member that was punched out into a permanently attached place within the second metal member.

9 Claims, 2 Drawing Sheets

METHOD OF JOINING METALS OF DIFFERENT PHYSICAL PROPERTIES

BACKGROUND OF THE INVENTION

In the manufacture of many different types of mechanical and electrical devices, it is desirable to insert a first metal having one property into a second metal having a distinctly different property. For example, it is desirable in certain motor structures that use a soft magnetic iron to provide an insert of a hard steel piece to form a bearing surface. If the parts are large, the combination of the two parts can be accomplished by conventional manufacturing techniques, but if the parts are small, this can be a significant problem.

In addition to combining a hard surface bearing material into a softer metal, it is desirable in some cases to insert a magnetic material into aluminum, a silver material for a contact into copper, or stainless steel into a mild steel. Any number of different combinations of structures can be envisioned in which a first metal having one characteristic is desired to be combined with a second metal having a totally different characteristic. Conventional attaching techniques such as soldering, staking, and forming can be used. Most of these processes require many steps, and are difficult to utilize when small parts are involved.

SUMMARY OF THE INVENTION

The present invention is directed to a method of manufacture wherein a first metal member is installed into a second metal member where the two metals have distinctly different properties. The present invention will be described specifically in connection with a structure for a small motor in which a soft magnetic iron member has inserted into it a small spring steel area that acts as a bearing surface for the end of the armature of the motor. While this particular application of the present method of manufacture will be described in some detail, it is understood that the present method of manufacture could be used for many different products.

An example of a further product that could readily be adapted to the present method of manufacture includes the insertion of silver alloy contacts into a copper or brass member. With the present method of manufacture a structure can be accomplished in a very accurate, inexpensive and practical manner.

Further, metals that normally are not readily soldered or otherwise joined can be joined by the present arrangement. This could be attaching materials to aluminum, such as the insertion of magnetic portions into an aluminum metal part. The soldering or other attachment of small parts to aluminum is rather difficult and the present method lends itself to many of those tasks.

In accordance with the present invention, there is provided a method of manufacture wherein a first metal is installed into a second metal having different properties than said first metal, including the steps of: placing a first metal adjacent a second metal; punching a portion of said first metal into, but not through, said second metal to form a recess while allowing said second metal to be extruded as a slug into a die generally corresponding in cross-section to a cross-section of a first punch; removing said first punch and said first metal from engagement with said second metal and said die with said portion of said first metal remaining installed in said second metal; placing said second metal including said portion of said first metal on a surface; and forcing a second punch of a larger size than said first punch against said second metal causing said first metal portion and said second metal slug to move back toward a surface of said second metal thereby causing said second metal to flow to lock said portion of said first metal into said second metal.

DESCRIPTION OF THE PREFERRED EMBODIMENTS

Figure 1:
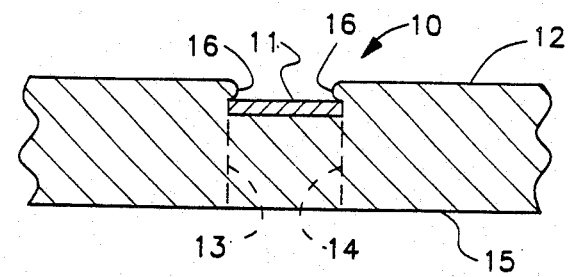
FIG. 1 is a partial cross-section of a finished part.
Figure 9:
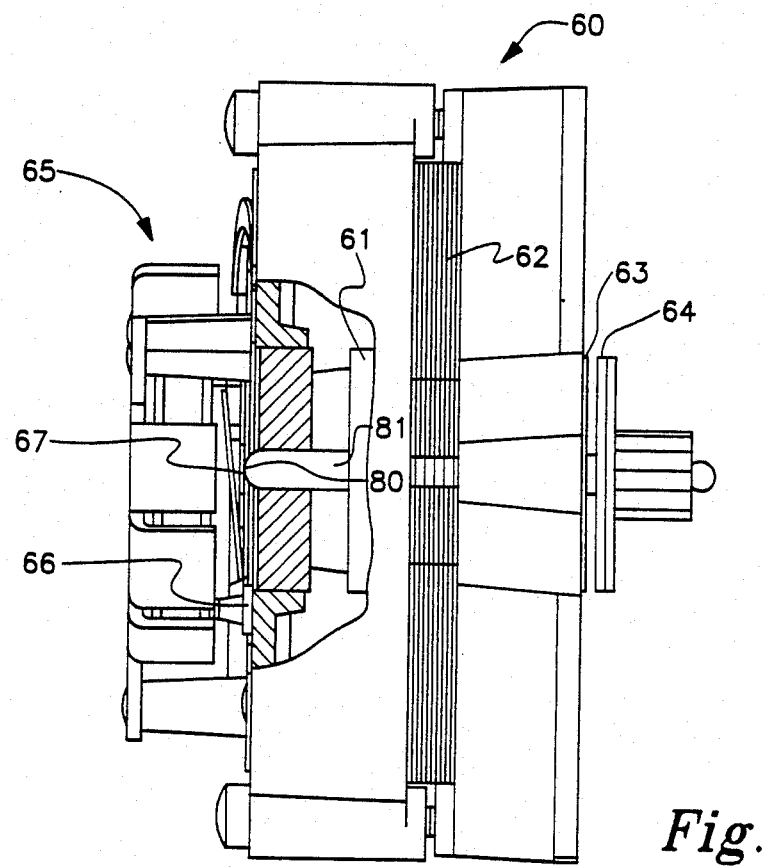
FIG. 9 is a disclosure of a typical motor in which this method is used.

In FIG. 1 there is disclosed a cross-section of a portion generally disclosed at 10 of a magnetic circuit of a motor of a type that will be disclosed in more detail in FIG. 9. The cross-section discloses at 11 a spring steel disk that is inserted in a soft magnetic iron 12 as a bearing surface. The method of manufacture that will be described causes the steel disk 11 to be forced into the magnetic member 12 with the material between the dotted lines 13 and 14 being extruded and then caused to return so that the bottom 15 of the member is substantially flat. The return of the material between the boundaries 13 and 14 to the position shown causes a crimp disclosed at 16 to occur that locks the steel member 11 into the magnetic member 12.

As will be explained in more detail in connection with FIG. 9, the hard spring steel surface 11 acts as a bearing surface for the end of an armature of a motor for which the portion 12 is part of the magnetic circuit. In order to understand the magnitude of the parts involved, the spring steel disk 11 is 0.080 inches in diameter, while the magnetic member has a diameter of roughly 1½ inches and a thickness of roughly 1/16 of an inch. It can be understood that attaching a disk of this small size creates a unique problem, and the present method of manufacture solves that problem.

The actual method of manufacturing will be described as occurring in two steps. The two steps that are involved will be explained in three different variations in FIGS. 4, 6, and 8.

Figure 2:
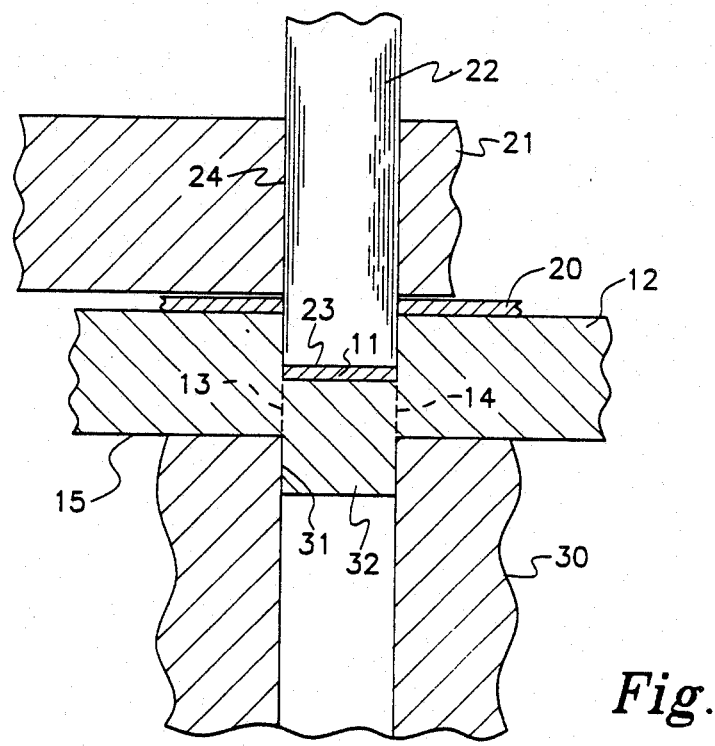
FIG. 2 discloses the first step in manufacture.

In FIG. 2, the first step is initiated by placing a spring steel member or strip 20 adjacent to the magnetic member 12. The spring steel strip is in the order of a thickness of 0.004 inches and lays adjacent to, or abutted to, the magnetic part 12. A spring steel stripper pad 21 is placed adjacent the spring steel member 20 to hold the members in position. A punch 22 having a flat end 23 projects through a hole 24 in the spring stripper pad 21.

Placed against the surface 15 of the member 12 is a bottom die 30 that has an opening 31 that corresponds to the diameter of the punch 22. The first step in the manufacturing process is to apply sufficient force to the punch 22 to punch out the disk 11 into the member 12 to a depth of approximately 0.025 inches. This punching action causes an extrusion of a slug 32 into the bottom die 30. Stress lines showing this action are again shown at 13 and 14. When the punch 22 is removed, the spring stripper pad 21 retains the strip of spring steel 20 in place and allows the punch to be removed thereby leaving the first metal or spring steel disk 11 installed within the second metal which is the soft magnetic iron 12 for the device.

Figure 3:
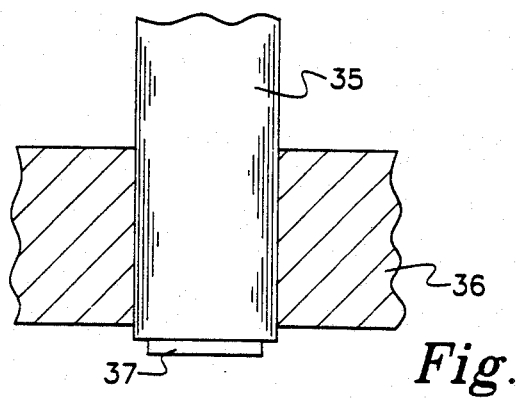
FIGS. 3 and 4 relate to the second step of manufacture.
Figure 4:
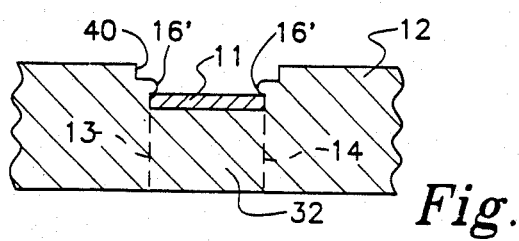

In connection with FIGS. 3 and 4, the second step in the process of manufacture is disclosed. A second punch 35 is disclosed with a stripper 36. The punch 35 is 0.110 inches in diameter and has a pilot or projection 36. The pilot or projection 37 has a depth of 0.002 inches and is 0.090 inches in diameter. The punch 35 of FIG. 3 is forced down against the part 12 disclosed in FIG. 2. The part 12 of FIG. 2 is placed on a flat surface without the benefit of the hole 31 in the bottom die 30. Force is applied to the punch 35, and the slug 32 is forced back in an upward direction. The stress lines 13 and 14 are again shown (FIG. 4) along with the disk 11 of the spring steel which is crimped at 16' by the reflow of the slug.

In FIG. 4 a portion of the finished part is shown wherein a counter step 40 is disclosed, and has a depth of 0.002 inches corresponding to a pilot 37 of the punch 35. The two steps of this manufacturing method provide a recessed and rigidly attached disk 11 of spring steel as a first metal installed in a second metal 12 which is a relatively soft magnetic iron portion of the motor previously mentioned.

This arrangement clearly shows a means for fabricating a first metal part into a second metal part where the two metals have distinctly different properties in order to facilitate the manufacture of components having different characteristics necessary in many fields.

Figure 5:
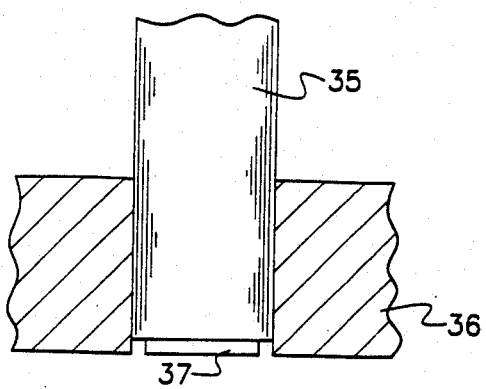
FIGS. 5 and 6 are an alternate second step of manufacture.
Figure 6:
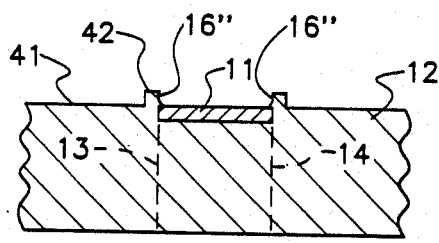

In FIGS. 5 and 6 the same steps as occurred in FIGS. 3 and 4 are shown. The punch 35 which has the pilot 37 and the stripper 36 is again shown. In this case as is disclosed in FIG. 6, the action of the punch causes the disk 11 to be held at 16" in the member 12 as a member that is flush with a surface 41 of the member 12. When the punch is operated in the arrangement of FIGS. 5 and 6, a raised or outer step is fabricated at 42 and is 0.002 inches in height. This is accomplished by proper positioning of punch 35 and stripper 36, as shown in FIG. 5.

Figure 7:
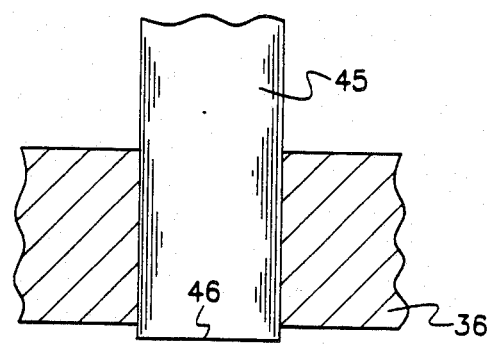
FIGS. 7 and 8 are a further modification of the second step of manufacture.
Figure 8:
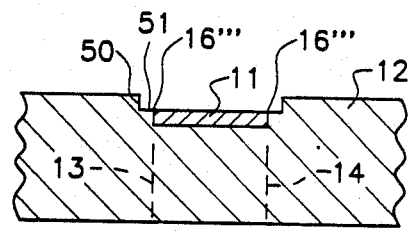

A third configuration of part is disclosed in connection with steps of FIGS. 7 and 8. A punch 45 is disclosed that has a flat end 46 and is again operated through the stripper 36. The flat end 46 causes the finished part in FIG. 8 to have a disk 11 locked at 16''' into the member 12 with a 0.002 counter step 50 but with the disk 11 flush with the bottom 51 of the counter step 50. Again, the stress lines 13 and 14 have been shown.

To this point three different configurations of a finished part have been disclosed, but in each case a spring steel disk 11 has been inserted permanently into a soft iron magnetic member 12 of a motor disclosed in FIG. 9.

It can be understood that the part disclosed in FIG. 1 could be made up of a brass or copper member 12 with a silver or silver alloy member 11 being inserted to form a contact arrangement as opposed to a bearing arrangement. Also, various metal combinations such as the insertion of a first steel member into a second aluminum metal, or the insertion of a first stainless steel metal into a mild steel second metal would be possible by the manufacturing technique disclosed.

In FIG. 9 a partial cross-section of a motor 60 is disclosed. This motor structure is disclosed to show an example of one of the uses of a member that is manufactured by the currently disclosed method. The motor 60 has a rotor 61 in an appropriate magnetic structure 62. The rotor 61 can be moved laterally to engage two brake surfaces 63 and 64. When the brake surfaces 63 and 64 are engaged, the rotor 61 is locked. When the rotor is shifted to the position shown, the motor is free to operate in a conventional manner.

A magnetic structure generally disclosed at 65 is the means for shifting the rotor 61. A magnetic member 66 is used as part of the magnetic structure 65 and has at 67 the spring steel insert which bears against an end 80 of a shaft 81 for the rotor 61. The bearing surface element 11 is disclosed in FIG. 1, while the magnetic structure 65 in general includes the magnetic member 12 disclosed in FIG. 1.

As can be seen, the steel insert 11 of FIG. 1 is a high wearing or bearing point, and must be of a harder material than the magnetic steel of which the rest of the structure is formed. The motor of FIG. 9 has been provided merely as an example of one application of the use of the present method in forming parts having two metal elements of entirely different properties.

It is quite clear that the present method of manufacture allows for the insertion of the first metal member into a second metal member by a simple series of punch and die operations. These operations allow for the insertion of very small metallic members into much larger metallic members with a permanent attachment so that the parts can be used in various types of devices and applications. A group of different applications have been specifically disclosed and discussed and the applicants wish to be limited in the scope of their invention solely by the scope of the appended claims.

The embodiments of an invention in which an exclusive property or right is claimed are defined as follows:

1. A method of manufacture wherein a first metal is installed into a second metal having different properties than said first metal, including the steps of: placing a first metal adjacent a second metal; punching a portion of said first metal into, but not through, said second metal to form a recess while allowing said second metal to be extruded as a slug into a die generally corresponding in cross-section to a cross-section of a first punch; removing said first punch and said first metal from engagement with said second metal and said die with said portion of said first metal remaining installed in said second metal; placing said second metal including said portion of said first metal on a surface; and forcing a second punch of a larger size than said first punch against said second metal causing said first metal portion and said second metal slug to move back toward a surface of said second metal thereby causing said second metal to flow to lock said portion of said first metal into said second metal.

2. A method of manufacture as claimed in claim 1 wherein said first metal is a hard metal, and said second metal is a magnetic iron.

3. A method of manufacture as claimed in claim 2 wherein said first metal is a spring steel bearing surface for use in a motor; and said second metal is a portion of a magnetic circuit in said motor.

4. A method of manufacture as claimed in claim 1 wherein said second punch has an end with a raised portion corresponding in size to said first die so that said first metal portion is recessed into said second metal below a counter step.

5. A method of manufacture as claimed in claim 1 wherein said second punch has an end with a raised portion corresponding in size to said first die so that said first metal portion is installed flush with said second metal; and said second metal flowing to create an outer step.

6. A method of manufacture as claimed in claim 1 wherein said second punch has a flat end so that said first metal portion is installed into said second metal flush with a counter step.

7. A method manufacture as claimed in claim 1 wherein said first metal is a highly conductive metal; and said second metal is a metal of less conductivity than said first metal.

8. A method of manufacture as claimed in claim 7 wherein said first metal includes silver as a main component; and said second metal includes copper as a main component.

9. A method of manufacture as claimed in claim 1 wherein said first metal is magnetic; and said second metal is non-magnetic.

* * * * *